US010966435B2

(12) United States Patent
Zhang et al.

(10) Patent No.: US 10,966,435 B2
(45) Date of Patent: Apr. 6, 2021

(54) SYSTEM FOR CONTROLLING LOW TEMPERATURE INJURY OF COLD-SENSITIVE FRUIT VEGETABLES BY COMBINING INTELLIGENT PRE-COOLING AND SEGMENTED CONTROLLED ATMOSPHERE STORAGE

(71) Applicant: Jiangnan University, Wuxi (CN)

(72) Inventors: Min Zhang, Wuxi (CN); Lei Feng, Wuxi (CN); Zhimei Guo, Wuxi (CN); Chunquan Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 361 days.

(21) Appl. No.: 15/936,541

(22) Filed: Mar. 27, 2018

(65) Prior Publication Data

US 2018/0310579 A1 Nov. 1, 2018

(30) Foreign Application Priority Data

Apr. 27, 2017 (CN) .......................... 201710193246.9

(51) Int. Cl.
*A23B 7/148* (2006.01)
*A23B 7/05* (2006.01)
(Continued)

(52) U.S. Cl.
CPC ................ *A23B 7/148* (2013.01); *A23B 7/04* (2013.01); *A23B 7/0441* (2013.01); *A23B 7/05* (2013.01);
(Continued)

(58) Field of Classification Search
CPC .. A23B 7/04; A23B 7/14; A23B 7/148; A23B 7/152; A23B 7/05; B65B 25/041
(Continued)

(56) References Cited

U.S. PATENT DOCUMENTS 5,163,360 A * 11/1992 Petz ....................... A23B 7/148
212/226
5,515,693 A * 5/1996 Cahill-O'Brien ...... A23B 7/148
426/419
(Continued)

FOREIGN PATENT DOCUMENTS

CN 1709075 A 12/2005
CN 102057981 A 5/2011
(Continued)

OTHER PUBLICATIONS

Wenyi Wei et al, "Changes of Quality and Some Enzyme Activities of 'Bayuecui' Peach during Controlled Atmosphere Storage", Scientia Silvae Sinicae, Mar. 2008, vol. 44, No. 3, 81-86.
(Continued)

*Primary Examiner* — Christopher M Koehler
(74) *Attorney, Agent, or Firm* — Bayramoglu Law Offices LLC

(57) ABSTRACT

A system for controlling low temperature injury of cold-sensitive fruit vegetables by combining intelligent pre-cooling and segmented controlled atmosphere storage includes a sensor detection module, a data collection module, a wireless communications module, a terminal, and a control system, where the sensor detection module detects carbon dioxide, ethylene, and the temperature and the humidity within a fresh keeping chamber, then data is collected by using the data collection module connected to the sensor detection module, and then varying data is transmitted to the terminal by using the wireless communications module connected to the data collection module; the sensor detection module is connected to the control system; and after the terminal reads data detected by a sensor, an environment parameter is controlled by using the control system.

7 Claims, 1 Drawing Sheet

(51) Int. Cl.
*F25D 31/00* (2006.01)
*B65B 25/04* (2006.01)
*A23B 7/04* (2006.01)
*F25D 17/04* (2006.01)
*F25D 29/00* (2006.01)
*A23B 7/152* (2006.01)
*B65B 63/08* (2006.01)

(52) U.S. Cl.
CPC ............ *A23B 7/152* (2013.01); *B65B 25/041* (2013.01); *F25D 17/042* (2013.01); *F25D 29/008* (2013.01); *F25D 31/005* (2013.01); *B65B 63/08* (2013.01); *F25D 2317/04131* (2013.01); *F25D 2700/12* (2013.01)

(58) Field of Classification Search
USPC .......................................................... 99/468
See application file for complete search history.

(56) References Cited

U.S. PATENT DOCUMENTS

| | | | | |
|---|---|---|---|---|
| 5,516,539 | A * | 5/1996 | Walsh ................... | A23B 7/148 426/231 |
| 5,791,236 | A * | 8/1998 | Schouten ............... | A23B 7/152 99/468 |
| 5,872,721 | A * | 2/1999 | Huston .................. | A23B 7/148 62/150 |
| 6,342,261 | B1 * | 1/2002 | Spencer ................. | A23B 4/16 426/312 |
| 2005/0233039 | A1 * | 10/2005 | Wolfe .................... | A23N 12/02 426/324 |
| 2012/0097050 | A1 * | 4/2012 | Schaefer ................ | A23B 7/144 99/468 |
| 2013/0013099 | A1 * | 1/2013 | Delele ................... | A23B 7/148 700/214 |
| 2015/0017296 | A1 * | 1/2015 | Veltman ................. | A23B 7/148 426/419 |
| 2015/0257401 | A1 * | 9/2015 | Brackmann ............ | A23B 7/152 426/232 |
| 2015/0316521 | A1 * | 11/2015 | Goldman ............... | A23B 7/148 73/31.05 |
| 2016/0106133 | A1 * | 4/2016 | Schmitz ............. | G05D 23/1917 426/231 |
| 2016/0198729 | A1 * | 7/2016 | Zhang .................... | A23B 7/152 426/419 |

FOREIGN PATENT DOCUMENTS

| | | |
|---|---|---|
| CN | 204682385 U | 10/2015 |
| CN | 105028619 A | 11/2015 |
| CN | 105211267 A | 1/2016 |
| CN | 105594842 A | 5/2016 |

OTHER PUBLICATIONS

Xian Zhou et al, "Chilling Injury and Anti-chilling Injury Measure of Fruit During Low Temperature Storage", Journal of Nanjing Forestry University(Natural Sciences Edition), May 2004, vol. 28, No. 3, 105-110.

Suqing Li et al., "Study on CA storage technology of green peppers", Science and Technoligy of Food Industry, 2014, vol. 35, No. 01, 318-322.

Zhensan Li et al, "Study on the theory and technology of apple double-change atmosphere storage", Deciduous Fruits, 1989, DOI : 10.13855/j.cnki.lygs.1989.s1.048, ISSN : 1002-2910, p. 1-6.

Zhonggang Zhan et al., "Effects of Mixture of Argon and Xenon Treatments on Preservation of Asparagus Spear", Journal of Food Science and Biotechnology, Mar. 2005, vol. 24, No. 2, 69-72.

Oshita S et al., "Extension of vase life of cut carnations by structured water", Acta Horticulturae,1996,vol. 0, No. 440,657-662.

* cited by examiner

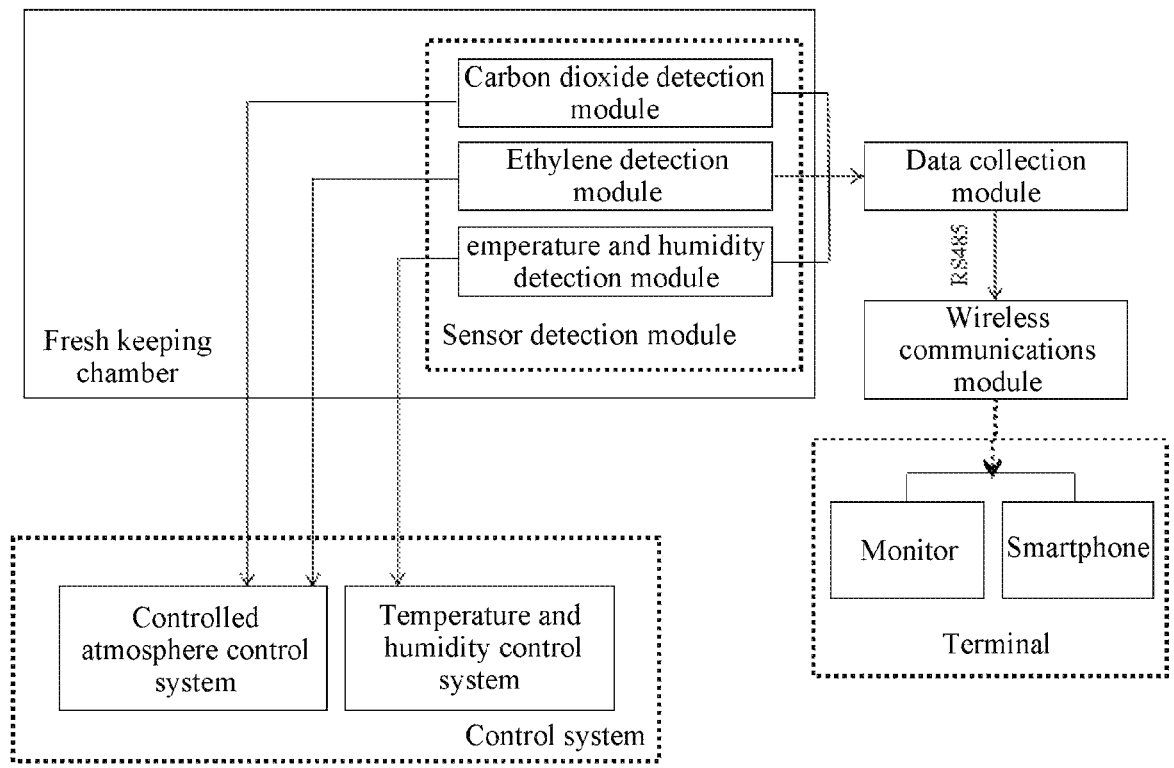

SYSTEM FOR CONTROLLING LOW TEMPERATURE INJURY OF COLD-SENSITIVE FRUIT VEGETABLES BY COMBINING INTELLIGENT PRE-COOLING AND SEGMENTED CONTROLLED ATMOSPHERE STORAGE

CROSS REFERENCE TO RELATED APPLICATIONS

This application is based on and claims priority from Chinese Patent application 201710193246.9, filed on Apr. 27, 2017, the entire contents of which are incorporated herein by reference.

TECHNICAL FIELD

The present invention relates to a system for controlling low temperature injury of cold-sensitive fruit vegetables by combining intelligent pre-cooling and segmented controlled atmosphere storage and belongs to the field of intelligent control technologies of food qualities.

BACKGROUND

After being picked, fruits and vegetables, as living organic life bodies, continuously perform physiological and chemical reactions (such as release of endogenous ethylene) under certain storage conditions. This accelerates maturity and aging of the fruits and vegetables. The temperature affects physical, chemical, and mutagenic reactions in storage of fruits and vegetables and is one of important factors that determine the storage quality of the fruits and vegetables. Cold injury may occur in storage of cold-sensitive fruits and vegetables under an uncomfortable temperature, and the fruits and vegetables become soft. A biological membrane system has phase transformation. Lipids change from a soft liquid crystal state to a gel state. Cracks appear on membranes. Membrane permeability increases, and ions leak. In addition, enzymatic capability on membranes is enhanced, flow of protoplasm is reduced, energy and ions lose balance, and generated physiological metabolism is disordered, causing serious rotting and quality deterioration. Because cold injury symptoms lag behind, the cold injury symptoms are dramatically shown only after being transferred to a normal sale condition. Cold injury detection is mainly determined by measuring quality indexes or physiological and chemical indexes related to cold injury. In this case, loss cannot be recovered. Therefore, respiration and release of ethylene of fruits and vegetables after being picked can be inhibited by combining preprocessing and low-temperature storage. This helps keep the quality of the fruits and vegetables be relatively stable and lowers an occurrence rate of cold injury.

The concept of pre-cooling was proposed by Powell and a partner thereof in 1904. Pre-cooling can rapidly remove field heat, reduce the temperature of fruits and vegetables, reduce respiration thereof and water evaporation, lower consumption of nutrient content, and can further inhibit activities of various microorganisms. In addition, pre-cooling can improve resistance of fruits to a low temperature, alleviate sensitiveness to a low temperature, and ease or postpone occurrence of cold injury. Therefore, pre-cooling is important content in a modern fruit and vegetable circulation system and is crucial to fresh keeping and storage of fruits and vegetables. Cold air pre-cooling manner has advantages of being easy in operation, having low investment, and being suitable for all fruits and vegetables and is widely applied to existing producing area pre-cooling. Chen Yongchun et al. researched an intelligent pre-cooling fresh-keeping storage house which integrates pre-cooling and storage. Pre-cooling and fresh-keeping modules of more than 10 common fruits and vegetables are preset in a control system. In this way, pre-cooling and fresh-keeping modes of different fruits and vegetables can be rapidly selected, and pre-cooling and fresh-keeping conditions are automatically recorded. Zuo Jinhua et al. (2015) disclosed "a multistage fruit and vegetable refrigerator (Publication No.: CN105211267A), where the temperature of cooling water of a first pre-cooling unit is higher than the temperature of cooling water supplied by a second pre-cooling unit, so that a problem of cold injury caused by an excessively low single-stage pre-cooling temperature of fruits and vegetables is effectively resolved. Yu Jinze et al. (2015) disclosed "a movable air-duct-type mixed flow frequency conversion pre-cooling machine (Publication No.: CN204682385U), where a fruit and vegetable temperature measurement probe is installed within the pre-cooling machine and is inserted into the interior of the fruits and vegetables, a fruit and vegetable temperature signal is transmitted to a temperature-controlled frequency conversion control cabinet, thereby adjusting airflow speeds of different temperature ranges. It can be learned from the foregoing patents and researches that pre-cooling is transitionally performed for a period at a particular temperature, and control needs to be implemented by inserting a temperature measurement probe into the interior of fruits and vegetables, causing mechanical damage to the fruits and vegetables. An online real-time monitoring system is used in the present invention, to ensure, according to a respiratory change in a pre-cooling process, that when field heat is rapidly removed from the fruits and vegetables after being picked in a pre-cooling phase, and when a respiratory speed is prominently lowered, that pre-cooling ends is prompted in time, thereby implementing intelligent regulation of pre-cooling and inhibiting occurrence of low temperature injury.

Controlled atmosphere storage is a storage method of lowering the concentration of oxygen in a storage environment and improving the concentration of carbon dioxide. Change of compositions of gas can change reactions of some products to a cold injury temperature, so as to alleviate cold injury of fruits and vegetables. A research made by Wei Wenyi et al. about "August crispy" peaches stored at 0 to 1° C. showed that 10% $O_2$+10% $CO_2$ can reduce the browning degree of fruits, postpone the time for the fruits to brown and occurrence of cold injury, and maintain relatively high soluble sugar content and catalase (CAT) activity. Zhou Xian et al. studied cold injury of low-temperature storage and regulation research progress thereof and found that when 10%, 20%, and 40% $CO_2$ are used to process grapefruit for 3 d and 7 d (at 21.2° C.), and then the grapefruit is stored at 4.4° C., it postpones the occurrence time of cold injury of the grapefruit. Zhang Zhengzhou (2015) disclosed a controlled atmosphere fresh keeping method for bitter gourds (Publication No.: CN105028619A). The method includes cleaning and sterilizing by using ozone water, and adding in a fresh bag a fresh keeping agent formed by mixing 1-methylcyclopropene and calcium peroxide, a controlled atmosphere ratio being N2:O2: CO2=(91~93)%: (4.5~5.5)%:(2 to 4)%. Bitter gourds do not have any undesirable phenomenon after being placed for 60 days. Li Suqing et al. researched impact of the concentrations of oxygen and carbon dioxide on the fresh keeping effect of green peppers and considered that the green peppers should use a gas concentration of (0 to 21 d) 6% $O_2$+5% $CO_2$+89% $N_2$ at the first half period and a gas concentration of (21 to 42 d) 4% $O_2$+2% $CO_2$+94% $N_2$ at the second half period, and by combining processing of a konjac glucomannan composite film, quality of green peppers can be relatively well kept, and the fresh keeping effect can be enhanced. Li Zhensan et al. researched controlled atmosphere storage of starking apples and found that under a condition of controlled atmosphere (12% $CO_2$+3% $O_2$ at an initial period 30 d, 9% $CO_2$+3% $O_2$ at a middle period 30 d, and 6% $CO_2$+3% $O_2$ at a late period 124 d), respiration is prominently reduced, an occurrence amount of ethylene is prominently reduced, content of conjugated trienes is prominently lowered, and superficial scald does not occur. It can be learned from the foregoing patents and research that controlled atmosphere storage performed by adjusting the concentrations of oxygen and carbon dioxide can alleviate cold injury, but a fresh keeping effect can be prominently enhanced only by combining chemical processing. The present invention combines intelligent pre-cooling and a segmented controlled atmosphere storage technology, and according to respiratory characteristics of cold-sensitive fruit vegetables, lowers, after pre-cooling, respiratory metabolism at an initial period of storage and inhibits respiratory and physiological metabolism at a late period of storage to inhibit occurrence of cold injury.

Inert gas such as argon, krypton, and xenon is dissolved in water and generates a "clathrate" hydrate. In the clathrate hydrate, water is a "main body" substance and forms, by means of hydrogen bonding, a lattice structure having holes of certain sizes. Relatively small gas molecules are "objects" and are surrounded in the holes, limiting activity of water between cells and affecting storage and fresh keeping of fruits and vegetables. In 1990s, the Tokyo University kept kale and flowers fresh by pressurizing with xenon, and effects were obvious. Zhan Zhonggang et al. researched preprocessing, preservation, and storage of asparagus by mixing inert gas, that the asparagus is processed in a room temperature for 24 h and is stored at 4° C. A result shows that compared with modified atmosphere packaging, the preservation effect of asparagus after being preprocessed by mixing inert gas is obvious, a respiratory peak of asparagus is inhibited, and membrane permeability is reduced. Zhang Min et al. (2005) disclosed "a three-stage composite preprocessing method for prolonging fresh time of perishable fruits and vegetables (Publication No.: CN1709075A)". The method combines water structurization processing by pressurizing (0.5-3.0 MPa) with mixed gas of carbon dioxide and argon and a nano silver antibacterial coating and achieves obvious effects in preservation of the perishable fruits and vegetables. Zhang Min et al. (2010) discloses "a combined fresh keeping method for prolonging a shelf life of a fresh vegetable lotus seed (Publication No.: CN102057981A)". The method combines inert gas water structurization processing and a controlled atmosphere fresh-keeping technology, thereby notably prolonging a fresh time and maintaining the quality and flavor of the lotus seed. Zhang Min et al. (2016) disclosed "an intelligent respiration climacteric fruit and vegetable quality recognition method implemented through pressurized inert gas pre-processing in combination with controlled atmosphere storage (Publication No.: CN105594842A). Change of quality of respiration climacteric fruits and vegetables is intelligently recognized through pressurized inert gas pre-processing in combination with controlled atmosphere storage. When the volume of carbon dioxide in an environment during a storage period reaches 5% to 7%, respiration climacteric fruits and vegetables become stale, implementing intelligent recognition of the quality. S. Oshita et al. researched impact of xenon on a storage period of carnations and found that a respiratory peak of carnations processed by xenon is inhibited, and the respiratory strength always declines steadily. In addition, compared with wither of carnations in a contrast group after being picked after 10 days, carnations in a xenon processing group do not go bad at the $16^{th}$ day. It can be learned from the foregoing patents and researches that an inert gas water structurization technology can inhibit respiration and reduce membrane permeability, and can prolong a storage period of fruits and vegetables by combining other fresh-keeping methods. In the present invention, segmented controlled atmosphere storage is performed by using high carbon dioxide and inert gas, high carbon dioxide is used at an initial period of storage to lower respiratory metabolism, and inert gas is used at a late period of storage to inhibit physiological metabolism, so as to lower an occurrence rate of cold injury and provide high security.

Current research methods for controlling low temperature injury by combining fruit and vegetable pre-cooling and controlled atmosphere storage are relatively complex, and fruits and vegetables have many categories. A cold injury phenomenon and lag of occurrence thereof have a large quantity of tasks in implementations, and there are many subjective influential factors. An online real-time monitoring system is used to intelligently control a pre-cooling time according to a respiratory change in a pre-cooling system environment, to rapidly remove field heat and prompt in time when the pre-cooling ends, thereby avoiding damage caused by over-processing, and controlling low temperature injury of cold-sensitive fruit vegetables by combining segmented storage of high carbon dioxide and inert gas. It is easy to operate the online real-time monitoring system in a highly accurate manner, and costs of fresh keeping of food are reduced.

SUMMARY

An objective of the present invention is to provide a system for controlling low temperature injury of cold-sensitive fruit vegetables by combining intelligent pre-cooling and segmented controlled atmosphere storage.

The technical solution of the present invention is: A system for controlling low temperature injury of cold-sensitive fruit vegetables by combining intelligent pre-cooling and segmented controlled atmosphere storage, comprising: a sensor detection module, a data collection module, a wireless communications module, a terminal, and a control system, wherein the sensor detection module detects carbon dioxide, ethylene, and the temperature and the humidity within a fresh keeping chamber, then data is collected by using the data collection module connected to the sensor detection module, and then varying data is transmitted to the terminal by using the wireless communications module connected to the data collection module; the sensor detection module is connected to the control system; and after the terminal reads data detected by a sensor, an environment parameter is controlled by using the control system.

The sensor detection module specifically comprises a carbon dioxide detection module, an ethylene detection module, and a temperature and humidity detection module, wherein the carbon dioxide detection module is configured to detect the concentration of carbon dioxide within the fresh keeping chamber, the ethylene detection module is configured to detect the concentration of ethylene within the fresh keeping chamber, and the temperature and humidity detection module is configured to detect the temperature and the humidity within the fresh keeping chamber;

the control system comprises a controlled atmosphere control system and a temperature and humidity control system, wherein the controlled atmosphere control system is configured to control release of inert gas within the fresh keeping chamber, and the temperature and humidity control system is configured to control the temperature and the humidity within the fresh keeping chamber;

the temperature and humidity detection module is connected to the temperature and humidity control system, and both the carbon dioxide detection module and the ethylene detection module are connected to the controlled atmosphere control system.

The terminal comprises a monitor and a smartphone, wherein the monitor is configured to record data transmitted from the wireless communications module, and the smartphone is configured to record data and give an alarm about a preset value.

The system for controlling low temperature injury of cold-sensitive fruit vegetables by combining intelligent pre-cooling and segmented controlled atmosphere storage, wherein a working manner is as follows:

(1) pre-cooling: air pre-cooling with a temperature of 0 to 4° C. for duration of 0.5 to 2 h is performed on a material within the fresh keeping chamber by using the temperature and humidity control system; in a pre-cooling process, the concentration of carbon dioxide within the fresh keeping chamber is collected in real time by using the carbon dioxide detection module; when the volumetric concentration of carbon dioxide reaches 2% to 3%, the pre-cooling ends; and (2) regulation of segmented controlled atmosphere storage: high-carbon dioxide and low-oxygen storage of a first phase is performed on the material within the fresh keeping chamber by means of modified atmosphere, and being controlled by the temperature and humidity control system, a storage temperature is 6 to 8° C., and a relative humidity is 85% to 95%; the concentration of ethylene within the fresh keeping chamber is detected by using the ethylene detection module; when the concentration of ethylene reaches 7 to 9 ppm, metabolism of ethylene prominently increases; inert gas storage of a second phase is performed; inert gas controlled atmosphere storage is adjusted within the fresh keeping chamber by using the controlled atmosphere control system, thereby inhibiting respiratory and physiological metabolism and lowering an occurrence rate of cold injury.

When the carbon dioxide detection module performs data collection, data collection is performed once every 1 min on the volume of carbon dioxide whose volumetric concentration is 0% to 25% within the fresh keeping chamber; each data collection uses a multi-point measurement manner and uses an average value as a detection signal to remotely transmit data in a wireless manner.

In step (2), the ethylene detection module performs real-time data collection once every 1 min on the concentration of ethylene whose concentration is 0 to 200 ppm within the controlled atmosphere storage system, and each data collection uses a multi-point measurement manner and uses an average value as a detection signal.

In step (2), during controlled atmosphere control of a first phase, modified atmosphere is performed by using a high-density polyethylene (HDPE) bag, to form a high-carbon dioxide and low-oxygen storage environment.

The controlled atmosphere storage is performed by using argon at a late period of storage of the second phase in step (2), thereby reducing membrane permeability, inhibiting respiratory and physiological metabolism, and lowering an occurrence rate of cold injury.

A feature of pre-cooling of the present invention is: using air pre-cooling with a pre-cooling temperature of 0 to 4° C. for duration of 0.5 to 2 h.

Features of detection of carbon dioxide within the system for pre-cooling cold-sensitive fruit vegetables in the present invention are: the concentration (0 to 25%) of carbon dioxide within the pre-cooling system is collected in real time by using a carbon dioxide sensor; data collection is performed once every 1 min on the volume of carbon dioxide within the pre-cooling system; each data collection uses a multi-point measurement manner and uses an average value as a detection signal to remotely transmit data in a wireless manner; and when the volume of carbon dioxide within the pre-cooling system reaches 2% to 3%, pre-cooling ends.

Features of segmented controlled atmosphere storage on cold-sensitive fruit vegetables in the present invention are: in a low-temperature storage period, regulation of segmented controlled atmosphere storage is performed according to respiratory and metabolic characteristics of the cold-sensitive fruit vegetables, a storage temperature is 6 to 8° C., and a relative humidity is 85% to 95%; at an initial period of storage, modified atmosphere is performed by using a high-density polyethylene (HDPE) bag, to form a high-carbon dioxide and low-oxygen storage environment; in this case, respiratory metabolism of the cold-sensitive fruit vegetables is lowered, and physiological metabolism slows down; when the concentration of ethylene reaches 7 to 9 ppm, metabolism of ethylene prominently increases; controlled atmosphere storage of inert gas is performed, that is, controlled atmosphere storage is performed by using argon at a late period of storage; a clathrate hydrate formed by combining inert gas and water molecules of the cold-sensitive fruit vegetables reduces membrane permeability, inhibits respiratory and physiological metabolism, and lowers an occurrence rate of cold injury.

Features of detection of ethylene within the controlled atmosphere storage system of cold-sensitive fruit vegetables in the present invention are: an ethylene sensor performs real-time data collection on the concentration (0 to 200 ppm) of ethylene within the controlled atmosphere storage system once every 1 min, and each data collection uses a multi-point measurement manner and uses an average value as a detection signal.

In a low-temperature storage process of the cold-sensitive fruit vegetables, internal tissues may have a series of physiological and biochemical changes, and respiratory metabolism thereof is closely related to change in the quality of the fruit vegetables. Long-time pre-cooling promotes disorder of metabolism and aggravates cold injury. Therefore, in the present invention, cold injury is inhibited by combining intelligent pre-cooling and segmented controlled atmosphere storage of cold-sensitive fruit vegetables. A time when respiration is prominently reduced in a pre-cooling process, that is, when the concentration of carbon dioxide reaches 2% to 3% is used as a pre-cooling intelligent control factor. Physiological metabolism of fruits and vegetables is cooperatively regulated by using the high-carbon dioxide and low-oxygen environment at the initial period of storage and the clathrate hydrate formed by the inert gas at the late period of storage. This is indeed effective in inhibiting low temperature injury, improves an intelligent level, and has relatively good generality and practicability.

Beneficial effects of the present invention are: in the system of the present invention, specific to some cold-sensitive fruit vegetables, a pre-cooling time is intelligently controlled by monitoring the volume (0 to 25%) of carbon dioxide in a pre-cooling process in real time, and modified atmosphere and segmented storage regulation of inert gas are performed by combining respiratory characteristics of the cold-sensitive fruit vegetables, thereby inhibiting low temperature injury. Compared with a current physical and chemical analysis method and an artificial sensory analysis method, the system in the present invention does not damage a to-be-tested sample, has few tasks, and is more objective and efficient.

BRIEF DESCRIPTION OF THE DRAWINGS

FIG. 1 is a block diagram of a control system according to the present invention.

DETAILED DESCRIPTION

Embodiment 1: A System for Controlling Low Temperature Injury of Tomatoes by Combining Intelligent Pre-Cooling and Segmented Controlled Atmosphere Storage A system for controlling low temperature injury of cold-sensitive fruit vegetables by combining intelligent pre-cooling and segmented controlled atmosphere storage, comprising: a sensor detection module, a data collection module, a wireless communications module, a terminal, and a control system, wherein the sensor detection module detects carbon dioxide, ethylene, and the temperature and the humidity within a fresh keeping chamber, then data is collected by using the data collection module connected to the sensor detection module, and then varying data is transmitted to the terminal by using the wireless communications module connected to the data collection module; the sensor detection module is connected to the control system; and after the terminal reads data detected by a sensor, an environment parameter is controlled by using the control system.

The sensor detection module specifically comprises a carbon dioxide detection module, an ethylene detection module, and a temperature and humidity detection module, wherein the carbon dioxide detection module is configured to detect the concentration of carbon dioxide within the fresh keeping chamber, the ethylene detection module is configured to detect the concentration of ethylene within the fresh keeping chamber, and the temperature and humidity detection module is configured to detect the temperature and the humidity within the fresh keeping chamber;

the control system comprises a controlled atmosphere control system and a temperature and humidity control system, wherein the controlled atmosphere control system is configured to control release of inert gas within the fresh keeping chamber, and the temperature and humidity control system is configured to control the temperature and the humidity within the fresh keeping chamber;

the temperature and humidity detection module is connected to the temperature and humidity control system, and both the carbon dioxide detection module and the ethylene detection module are connected to the controlled atmosphere control system.

The terminal comprises a monitor and a smartphone, wherein the monitor is configured to record data transmitted from the wireless communications module, and the smartphone is configured to record data and give an alarm about a preset value.

Fresh, unrotten, uniform, and green-mature tomatoes 1000 g are selected and are subject to pre-cooling under 2° C. (an environment temperature is the room temperature 25° C.). The concentration of carbon dioxide in a pre-cooling process is collected in real time. When a preprocessing time is 50 min, the volume of carbon dioxide reaches 2%. In this case, respiratory intensity is lowered, and pre-cooling ends. Low-temperature storage is performed at 7° C.; segmented controlled atmosphere fresh-keeping is performed according to respiratory and metabolism characteristics. At an initial period ($0^{th}$ to $10^{th}$ d) of storage, a high-density polyethylene (HDPE) bag performs modified atmosphere. At an $11^{th}$ d of low-temperature storage, the concentration of ethylene reaches 8 ppm. In this case, a release speed of ethylene prominently increases, and controlled atmosphere storage of a late period ($12^{th}$ to $25^{th}$ d) of inert gas, that is, argon, is performed. Cold injury postpones occurring at the $16^{th}$ to $18^{th}$ d, and a cold injury rate is less than 10%.

Embodiment 2: A System for Controlling Low Temperature Injury of Broccoli by Combining Intelligent Pre-Cooling and Segmented Controlled Atmosphere Storage The configuration of the system structure is the same as that of embodiment 1.

Fresh, unrotten, and uniform broccoli 1000 g are selected and are subject to pre-cooling under 4° C. (an environment temperature is the room temperature 25° C.). The concentration of carbon dioxide in a pre-cooling process is collected in real time. When a preprocessing time is 65 min, the volume of carbon dioxide reaches 2%. In this case, respiratory intensity is lowered, and pre-cooling ends.

Low-temperature storage is performed at 7° C.; segmented controlled atmosphere fresh-keeping is performed according to respiratory and metabolism characteristics. At an initial period ($0^{th}$ to $12^{th}$ d) of storage, a high-density polyethylene (HDPE) bag performs modified atmosphere. At an $13^{th}$ d of low-temperature storage, the concentration of ethylene reaches 7 ppm. In this case, a release speed of ethylene prominently increases, and controlled atmosphere storage of a late period ($13^{th}$ to $25^{th}$ d) of inert gas, that is, argon, is performed. Cold injury postpones occurring at the $15^{th}$ to $17^{th}$ d, and a cold injury rate is less than 10%.

What is claimed is:

1. A system for controlling low temperature injury of cold-sensitive fruits and vegetables by combining a pre-cooling and a segmented controlled atmosphere storage, the system comprising:
    a sensor detection module,
    a data collection module,
    a wireless communications module,
    a terminal, and
    a control system,
    wherein the sensor detection module is capable of detecting carbon dioxide, ethylene, and a temperature and a humidity within a fresh keeping chamber,
    then data is configured to be collected by the data collection module connected to the sensor detection module, and
    then the data is configured to be transmitted to the terminal by the wireless communications module connected to the data collection module; the sensor detection module is connected to the control system; and
    after the terminal is configured to read the data, wherein the data is configured to be detected by a sensor, an environment parameter is configured to be controlled by the control system, and the sensor detection module comprises a carbon dioxide detection module, an ethylene detection module, and a temperature and humidity detection module, wherein the carbon dioxide detection module is configured to detect the concentration of carbon dioxide within the fresh keeping chamber, the ethylene detection module is configured to detect the concentration of ethylene within the fresh keeping chamber, and the temperature and humidity detection module is configured to detect the temperature and the humidity within the fresh keeping chamber;

the control system comprises a controlled atmosphere control system and a temperature and humidity control system, wherein the controlled atmosphere control system is configured to control release of inert gas within the fresh keeping chamber, and the temperature and humidity control system is configured to control the temperature and the humidity within the fresh keeping chamber; and the temperature and humidity detection module is connected to the temperature and humidity control system, and both the carbon dioxide detection module and the ethylene detection module are connected to the controlled atmosphere control system; and wherein the carbon dioxide detection module, ethylene detection module and temperature and humidity detection module are inside of the fresh keeping chamber, and the controlled atmosphere control system and the temperature and humidity control system are outside of the fresh keeping chamber.

2. The system for controlling low temperature injury of cold-sensitive fruit vegetables by combining the pre-cooling and the segmented controlled atmosphere storage according to claim 1, wherein the terminal comprises a monitor and a smartphone, wherein the monitor is configured to record the data transmitted from the wireless communications module, and the smartphone is configured to record the data and give an alarm about a preset value.

3. The system for controlling low temperature injury of cold-sensitive fruit vegetables by combining the pre-cooling and the segmented controlled atmosphere storage according to claim 1, wherein an air pre-cooling with a temperature of 0 to 4° C. for a duration of 0.5 to 2 h is configured to be performed on a material within the fresh keeping chamber by the temperature and humidity control system; in a pre-cooling process, the concentration of carbon dioxide within the fresh keeping chamber is configured to be measured in real time by using the carbon dioxide detection module; the pre-cooling is capable of ending when the volumetric concentration of carbon dioxide is configured to reach 2% to 3%; and a high-carbon dioxide and low-oxygen storage of a first phase is configured to be performed on the material within the fresh keeping chamber by means of a modified atmosphere, and capable of being controlled by the temperature and humidity control system, a storage temperature is 6 to 8° C., and a relative humidity is 85% to 95%; the concentration of ethylene within the fresh keeping chamber is configured to be detected by the ethylene detection module; when the concentration of ethylene is configured to reach 7 to 9 ppm, metabolism of ethylene is capable of increasing; inert gas storage of a second phase is configured to be performed; an inert gas controlled atmosphere storage is configured to be adjusted within the fresh keeping chamber by using the controlled atmosphere control system, thereby being capable of inhibiting a respiratory and physiological metabolism and being capable of lowering an occurrence rate of cold injury.

4. The system for controlling low temperature injury of cold-sensitive fruit vegetables by combining the pre-cooling and the segmented controlled atmosphere storage according to claim 3, wherein when the carbon dioxide detection module is capable of performing data collection, data collection is configured to be performed once every 1 min on the volume of carbon dioxide whose volumetric concentration is 0% to 25% within the fresh keeping chamber; each data collection uses a multi-point measurement manner and uses an average value as a detection signal to remotely transmit the data in a wireless manner.

5. The system for controlling low temperature injury of cold-sensitive fruit vegetables by combining the pre-cooling and the segmented controlled atmosphere storage according to claim 3, wherein the ethylene detection module is capable of performing real-time data collection once every 1 min on the concentration of ethylene whose concentration is 0 to 200 ppm within the controlled atmosphere storage system, and each data collection uses a multi-point measurement manner and uses an average value as a detection signal.

6. The system for controlling low temperature injury of cold-sensitive fruit vegetables by combining the pre-cooling and the segmented controlled atmosphere storage according to claim 3, wherein during controlled atmosphere control of a first phase, the modified atmosphere is configured to be performed by using a high-density polyethylene (HDPE) bag, configured to form the high-carbon dioxide and low-oxygen storage environment.

7. The system for controlling low temperature injury of cold-sensitive fruit vegetables by combining the pre-cooling and the segmented controlled atmosphere storage according to claim 3, wherein the segmented controlled atmosphere storage is configured to be performed by using argon at a late period of storage of the second phase, thereby being capable of reducing membrane permeability, being capable of inhibiting respiratory and physiological metabolism, and being capable of lowering an occurrence rate of cold injury.

* * * * *